April 4, 1961 W. M. HUTCHINSON ET AL 2,978,429
POTTING COMPOSITION COMPRISING A BUTADIENE-DIVINYLBENZENE COPOLYMER
IN ADMIXTURE WITH A BUTADIENE-2-METHYL-5-VINYLPYRIDINE
COPOLYMER AND PROCESS OF MAKING SAME
Filed July 12, 1954
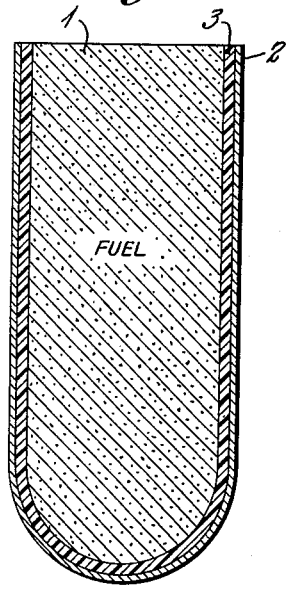
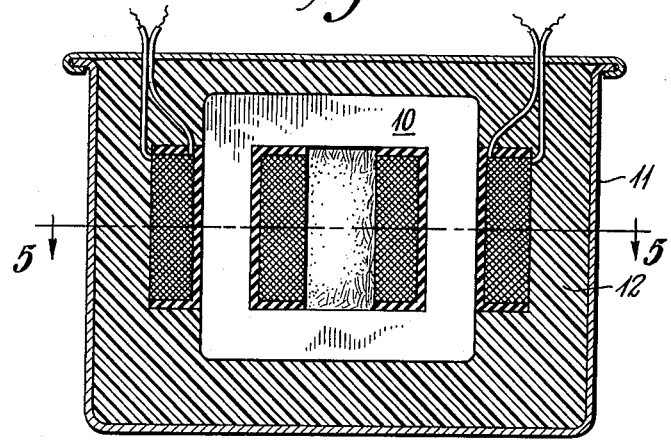
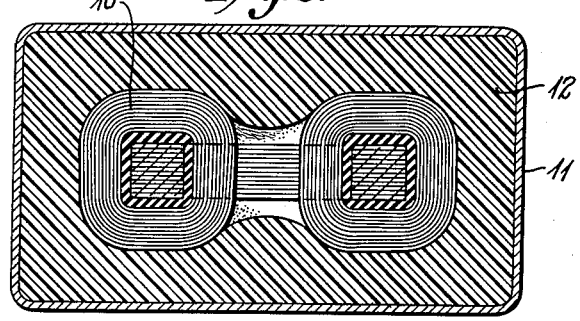
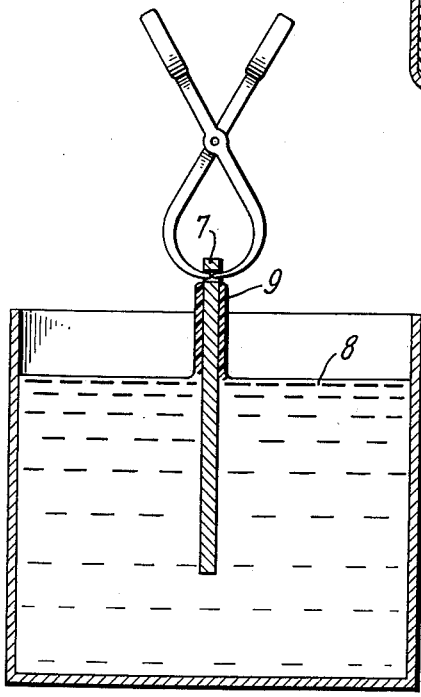
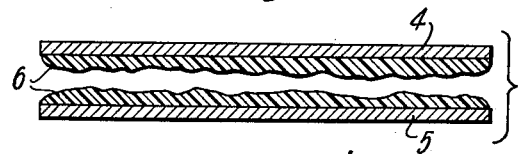
INVENTORS
W. M. Hutchinson
C. A. Uraneck
BY
Hudson & Young
ATTORNEYS

United States Patent Office 2,978,429
Patented Apr. 4, 1961

2,978,429

POTTING COMPOSITION COMPRISING A BUTADIENE-DIVINYLBENZENE COPOLYMER IN ADMIXTURE WITH A BUTADIENE-2-METHYL-5-VINYLPYRIDINE COPOLYMER AND PROCESS OF MAKING SAME

William M. Hutchinson, Bartlesville, Okla., and Carl A. Uraneck, Phillips, Tex., assignors to Phillips Petroleum Company, a corporation of Delaware Filed July 12, 1954, Ser. No. 442,879

6 Claims. (Cl. 260—30.8)

This invention relates to a novel potting composition. In one of its aspects this invention relates to a potting composition prepared by blending natural or synthetic rubber with a copolymer of a conjugated diene with a polyvinyl compound to form a fluid which upon curing, sets to a firm product. In still another aspect this invention relates to a novel potting composition having good bonding qualities.

Potting compounds are well known in the art and are of many types and have many and varied uses. On the other hand, there is a continuous search for new potting compounds having particular properties or uses, being lower in cost, being easily prepared or being otherwise competitive with known materials.

We have found that potting compounds having outstanding physical properties can be prepared by blending natural or synthetic rubber with a liquid copolymer of a conjugated diene and a cross linking compound, selected from the group consisting of polyvinyl compounds and monovinylacetylene, with compounding ingredients, to give a fluid which, upon curing, sets to a firm product having the desired flexibility and bonding properties. These potting compounds are applicable for manufacturing assemblies in which the components are made from various types of materials such as metal, rubber and plastics. They are particularly applicable for use in electrical equipment such as transformers, coils and the like; as a liner material for bonding a solid propellant charge to the metal casing or motor chamber, potting of electronic assemblies, as components in laminated structures, for sealing pipes, as putty, coating for metals, etc. Some of these uses are illustrated in the drawings of which:

Figure 1 is a cross sectional view of a metal casing having a solid propellant sealed thereto by the use of our composition, Figure 2a shows two solid components coated with our composition prior to bonding, Figure 2b shows the assembled components of Figure 2a, Figure 3 illustrates the dipping of a solid into the liquid composition of our invention and the liquid material adhering to said solid, Figure 4 is a cross sectional view of a transformer potted in a metal case illustrating the use of our composition as a potting compound for electrical equipment, and Figure 5 is a top sectional view of Figure 4 taken along lines 5—5.

An object of this invention is to provide a new potting and bonding composition. Another object of this invention is to provide a liquid or semi-liquid composition of matter which sets to a firm product having good bonding and potting properties when cured. Still another object of this invention is to provide a method of producing a novel potting composition. A further object of this invention is to provide a method of using a potting composition having superior potting and bonding properties. Those skilled in the art will see other objects and advantages of this invention upon reading this disclosure and the attached claims.

The potting compositions of this invention can be prepared by any suitable blending method such as by a roll mill, paint mill, pug mill or other type of blenders. Sufficient liquid copolymer will be used so that the product will be sufficiently fluid that it can be readily applied by any means such as by pouring or forcing it around the various elements of the assembly being bonded by the desired method such as by the use of grease fittings. The composition is then cured by maintaining the assembly at an elevated temperature such as by baking for the requisite period to give a firm, well bonded but flexible product. The time of curing will be dependent upon the curing temperature which will generally be in the range of 100 to 350° F.

The rubbery component in the potting composition may be either natural or synthetic rubber. It can range from a very soft material, i.e., a product having a Mooney value (ML-4) of 10 or lower up to a rubber having a Mooney value of 60 or even higher. Rubbery copolymers of vinylpyridine are frequently preferred, e.g., butadiene/methylvinylpyridine rubbery copolymers, since such synthetic rubbery materials adhere well to metal surfaces.

As has been said, any rubbery material can be used as the rubber component of our composition. While many such products are known to the art, the rubbery compounds most frequently used, and therefore are preferred by us, are natural rubbers, polymers of conjugated dienes containing 4 to 6 carbon atoms per molecule and copolymers of these conjugated dienes with monomeric material copolymerizable therewith. By the way of example the following conjugated dienes can be mentioned: 1,3-butadiene, 2,3-dimethyl-1,3-butadiene, isoprene, piperylene, 3-furyl-1,3-butadiene, 2-methoxy-1,3-butadiene, chloroprene (2-chloro-1,3-butadiene), bromoprene, methylchloroprene and the like.

Monomers copolymerizable with conjugated dienes include aryl olefins, acrylic and substituted acrylic acids and their ethers, esters, ketones, nitriles and amides. Examples of such monomers and copolymerizable monomers include styrene, various alkyl styrenes, p-chlorostyrene, p-methoxystyrene, alpha-methylstyrene, vinyl-naphthalene, acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide, methylisopropenyl ketone, methyl vinyl ketone, methyl vinyl ether, vinyl acetate, vinyl chloride, vinylidene chloride, vinylfurane, vinylcarbazole, vinylacetylene, and the like. The conjugated dienes can also be copolymerized with each other. In the production of synthetic rubbers a conjugated diene is usually copolymerized with a minor amount of one or more compounds containing an active $CH_2=C<$ group which will be copolymerizable therewith such as aryl olefins, acrylic and substituted acrylic acids, esters, nitrile, and amides, methylisopropenyl ketone, vinyl chloride, and vinyl substituted pyridines. As can be deducted from the foregoing there are a host of possible synthetic rubbers, the most readily and commercially available monomers at present are butadiene itself (1,3-butadiene), isoprene, chloroprene and styrene.

The liquid copolymers employed are copolymers of a conjugated diene with a cross linking compound such as polyvinyl compounds and monovinyl acetylene. These materials are conveniently prepared by emulsion polymerization at a temperature in the range of −40 to 160° F. in the presence of sufficient modifying agent to yield a liquid polymer. In addition to a single conjugated diene and a cross linking compound, liquid polymers prepared from a mixture of conjugated dienes, or from one or more other copolymerizable materials such as styrene, alpha-methylstyrene, acrylonitrile, acrylic or methacrylic acids or their esters and the like along with the cross linking compound are also applicable. The conjugated diene is employed in an amount in the range of 1 to 99 parts per 100 parts of monomeric material.

Examples of conjugated dienes which are applicable in our process are those conjugated dienes which contain 4 to 8 carbon atoms per molecule. However, the conjugated dienes most frequently used are those containing 4 to 6 carbon atoms per molecule and include 1,3-butadiene, isoprene, piperylene, methylpentadiene, 2,3-dimethyl-1,3-butadiene, 2,3-diethyl-1,3-butadiene haloprenes such as chloroprene and bromoprene, etc.

Cross linking compounds are used in the ratio of 1 to 10 parts by weight per 100 parts total monomer and include polyvinyl aromatic compounds such as divinylbenzene, trivinylbenzenes, di(alpha-methylvinyl)benzenes, isopropenylvinylbenzene, divinylnaphthalenes, trivinylnaphthalene, divinyldiphenyls wherein the vinyl can be further substituted with alkyl groups, divinyl sulfide; divinylsulfone; divinyl ether; divinylketone; polyacrylate esters of polyhydric alcohols such as ethylene glycol, propylene glycol, butylene glycol, hexylene glycol, octylene glycol, glycerine, 1,2,4-trihydroxybutane, 1,2,6-trihydroxyhexane; 1,2,3,4-tetrahydroxybutane and the like; and monovinylacetylene. The polyvinyl compounds can be represented by the general formula:

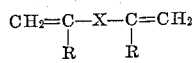

where R is H or $CH_3$ and where X is selected from the group consisting of:

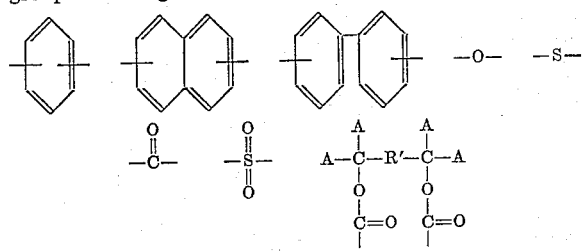

A is H, alkyl or hydroxyalkyl group and R' is a carbon to carbon linkage, an alkylene group or an alkylene group substituted with the radical

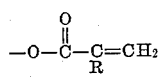

or is substituted with an —OH. Where X is an aromatic radical, it can be further substituted by alkyl or alkenyl radical of 1 to 6 carbon atoms such as methyl, ethyl, butyl, isobutyl, vinyl, alpha-methylvinyl, hexyl, isohexyl, amylisobutyl, etc.

We have found that the polyvinyl aromatic compounds as shown above and monovinylacetylene are of particular value as the cross linking monomers. These compounds are well known in the art and are easily and readily prepared commercially.

The modifiers are used in the range of 5 to 50 parts by weight for each 100 parts of monomeric material. While any modifying agent known to the art can be used without departing from the scope of our invention, the modifying agents most generally used are sulfur containing compounds such as mercaptans, organic sulfides, thio and dithioic acids and salts, xanthogenic acids and salts, thiocarbamic acids and salts and the like. However, the aryl and alkyl mercaptans are most generally used as modifiers in emulsion systems and we have found the tertiary aliphatic $C_{12}$ to $C_{16}$ mercaptans of particular value. The mercaptans used will generally contain three to sixteen carbon atoms per molecule. Mixtures or blends of mercaptans are also used. The amount of mercaptan employed will be dependent upon the particular mercaptan compound or blend, the operating temperature, the monomeric material employed, etc. In any case sufficient modifier is used to insure a liquid polymer or copolymer.

The liquid polymers useful in our invention are fully described and claimed in the copending application of C. A. Uraneck and W. M. St. John filed April 9, 1954 and having Serial Number 422,254, now U.S. Patent 2,888,442.

The compounding ingredients will include an accelerator, activator and vulcanizing agent. Modifiers, plasticizers, antioxidants, etc. can be used if desired. It is also within the scope of this invention to incorporate extenders and fillers if desired. The particular compounding ingredients used will be dependent upon the desired physical properties of the cured composition.

Many vulcanization accelerators are known to those skilled in the art and any of these accelerators can be used. Examples of these include 2-mercaptothiazoline, formaldehyde p-toludine, mixed diarylguanidine, piperidinium pentamethylene dithiocarbamate, benzothiazyl disulfide, zinc dibenzyl dithiocarbamate, zinc dibutyl dithiocarbamate, zinc diethyl dithiocarbamate, 2-mercaptobenzothiazole, dibutyl xanthogen disulfide, diphenylguanidine, tetramethyl thiuram disulfide, and many others.

There are many vulcanization accelerator-activators known in the art. Examples of such compounds include lead oxide, zinc oxide, magnesium oxide, mixture of magnesium oxide and carbon, lead carbonate, hydrated lime, lead silicate, dibutyl ammonium oleate, oleic acid, dibenzylamine, linseed oil, fatty acids, rosin acids, triethanolamine, zinc stearate, etc.

The vulcanizing agents are also well known in the art and include sulfur, p,p'-dibenzoylquinonedioxine, p-quinonedioxine, magnesium oxide, sulfur dichloride, sulfur monochloride, alkyl phenol monosulfide, alkyl phenol disulfide, etc. Many of the accelerator-activators also function as vulcanizing agents, for example, litharge, red lead, lead silicate, etc.

The antioxidants which are also well known in the art include hydroquinone monobenzyl ether, phenyl-beta-naphthylamine, polymerized trimethyldihydroquinoline, heptylated diphenylamine, glycerol monoester of salicylic acid, hexachloronaphthalene, poly diaryl amine, hydrocarbon waxes, etc.

Typical polymerization modifiers have been mentioned in connection with preparation of the liquid copolymeric material.

The proportions of rubbery material and liquid copolymer employed in the preparation of the potting composition of this invention may be varied over a wide range and will depend upon the characteristic of the individual polymers as well as upon the compounding ingredients. The composition, prior to curing, must be sufficiently fluid for application. If a low Mooney rubber is employed, a smaller amount of the liquid copolymer is generally desired than when a higher Mooney rubber is used. In some instances it is preferred that a plasticizer be present in the potting composition in addition to other compounding ingredients. Such a material will also have an effect on the fluidity of the composition. In general, the amount of liquid polymer employed is generally in the range between 1 and 1000 parts by weight, and more generally between 50 and 200 parts by weight, per 100 parts of the rubbery component.

Plasticizers are employed to increase the fluidity of the potting composition and to improve the low temperature properties. Conventional rubber plasticizers are applicable such as dioctyl phthalate, benzophenone, amylbiphenyl, dibutyl carbitol formal, trioctyl phosphate, tricresyl phosphate, etc. The amount of plasticizer incorporated in the potting compositions is generally in the range between 0 and 500 parts by weight, preferably between 20 and 50 parts by weight, per 100 parts of the rubbery polymer. The desired strength and bonding properties of the composition and potting technique will be among the determining factors as to whether a plasticizer is used or not and as to how much will be employed if any.

These potting compositions of our invention have the advantage of undergoing minimum volume change with change in temperature, having very low shrinkage upon curing, providing excellent bonding between elements in structures where they are employed and are of such consistency as to lend themselves to convenient handling in fabrication operations.

Our invention will be further described by the following examples which show how our potting compound can be used and are typical of our composition. These examples are illustrative only and are not to be considered limiting.

*Example I*

The following composition was prepared by mixing the ingredients on a roll mill to produce a viscous fluid capable of being cured into a solid having typical rubbery properties of high elongation and good tensile strength.

| | Parts by weight |
|---|---|
| 90/10 butadiene/2-methyl-5-vinylpyridine copolymer (20 ML–4) | 100 |
| 95/5 butadiene/divinylbenzene liquid copolymer [1] | 50 |
| Carbon black (Philblack A) [2] | 10 |
| Dicapryl phthalate | 30 |
| Epichlorohydrin | 6 |
| Butyl zimate | 4.5 |
| Sulfur | 1.5 |
| Zinc oxide | 4.5 |
| Xylyl mercaptan | 1.0 |

[1] Copolymer prepared by emulsion polymerization at 41 F. using the following recipe:

| | Parts by weight |
|---|---|
| Water | 250 |
| Butadiene | 95 |
| Divinylbenzene | 5 |
| Potassium fatty acid soap | 7.5 |
| KOH | 0.08 |
| KCl | 0.2 |
| Daxad 11 (sodium salt of condensed alkyl aryl sulfonic acid) | 0.2 |
| $K_4P_2O_7$ | 0.165 |
| $FeSO_4 \cdot 7H_2O$ | 0.139 |
| Diisopropylbenzene hydroperoxide | 0.107 |
| Tert-dodecyl mercaptan | .25 |

[2] Masterbatched into the 20 Mooney copolymer.

The foregoing liquid composition was forced into a 1/16 inch annular space between a cylindrically molded specimen of highly filled rubber and a mild steel case whose internal surface had been grit blasted. The molded cylinder of rubber composition was 3 inches in diameter and 5 inches in length. The case was equal in length with an inside diameter 1/8 inch larger than the molded cylinder. The liquid composition was forced into the annulus until it had displaced all of the air and had partially overflowed at each end. The assembly was placed in an oven at 170 F. and cured for 24 hours to convert the viscous liquid into an adherent rubbery solid. After curing, the excess rubber was removed by trimming. Examination revealed that the potting composition formed a strong bond between the molded rubber composition and the metal case, thereby forming an integrated assembly.

*Example II*

The following potting composition was prepared by mixing the ingredients on a roll mill:

| | Parts by weight |
|---|---|
| 90/10 butadiene/2-methyl-5-vinylpyridine copolymer (20 ML–4) | 100 |
| Carbon black (Philblack A) [1] | 10 |
| 95/5 butadiene/divinylbenzene liquid copolymer [2] | 75 |
| Benzophenone | 30 |
| Butyl zimate | 6 |
| Sulfur | 2 |
| Zinc oxide | 6 |
| Epichlorohydrin | 6 |
| $HNO_3$, white fuming | 3 |

[1] Masterbatched into the 20 Mooney copolymer.
[2] Described in Example I.

The composition was a viscous fluid. It was employed as described in Example I for potting a rubber cylinder into a metal case. The assembly was placed in an oven at 170 F. and cured for 24 hours to convert the liquid into an adherent rubbery solid. After curing, examination revealed an integrated assembly similar to that described in Example I.

*Example III*

The following recipes were used for preparing three potting compositions.

| | 1 | 2 | 3 |
|---|---|---|---|
| 90/10 Butadiene/2-methyl-5-vinylpyridine copolymer (20 ML–4) | 100 | 100 | 100 |
| Carbon black (Philblack A) [1] | 10 | 10 | 10 |
| 95/5 Butadiene/divinylbenzene liquid copolymer [2] | 100 | | |
| Liquid polybutadiene (sodium polymer) | | 100 | |
| Liquid polybutadiene (emulsion polymer) | | | 100 |
| Amylbiphenyl | 15 | 15 | 15 |
| Benzophenone | 15 | 15 | 15 |
| Butyl zimate | 6 | 6 | 6 |
| Sulfur | 2 | 2 | 2 |
| Zinc oxide | 6 | 6 | 6 |
| Epichlorohydrin | 6 | 6 | 6 |

[1] Masterbatched into the 20 Mooney polymer.
[2] Described in Example 1.

The compositions were fluid before curing. When employed for potting a rubber cylinder into a metal case as in the preceding examples, the first composition formed a bond which was superior to that formed with the other two compositions in that it was more difficult to separate it from the metal case.

Test specimens were obtained by curing samples of each of the compositions in a Carver press for 16 hours at 170 F. The following tensile strength and elongation values were obtained:

| | 1 | 2 | 3 |
|---|---|---|---|
| Tensile strength, p.s.i. | 65 | 70 | 80 |
| Elongation at break, percent | 500 | 300 | 400 |

This last example is given to show the superior bonding properties of our composition over a composition comprising a rubbery copolymer and ordinary liquid polymers. While our composition had a lower tensile strength, the elasticity was much superior to the other two compositions. The bonding properties were much superior to the other two compositions.

Examples of use of our potting composition can best be shown by referring to the attached drawings.

Referring to Figure 1, solid propellant fuel 1 is centered inside metal case 2. A liquid blend such as prepared in Example 1 is then poured into the annular space between the fuel and the case. The composition is then cured at a somewhat elevated temperature thereby forming an integrated assembly. Those skilled in the art will see many applications of this method of sealing a solid in a casing.

Referring to Figures 2a and 2b, plates 4 and 5 are first coated with a layer of our composition 6 after which they are brought together under pressure and the composition cured. This method is applicable for preparing laminated structures and can be used for bonding a plurality of plates together.

Referring to Figure 3, a metal device 7 is dipped into our composition 8. As the device is withdrawn, a thin film 9 clings to the device. This film can then be cured forming a permanent coating on the device.

Referring to Figures 4 and 5, a transformer is lowered into case 11. The case is sealed and evacuated. The potting compound is then admitted under vacuum filling the evacuated assembly. This method avoids air bubbles and insures completely filling the case. However, other potting methods can be used, for example, pouring the potting compound around the assembly.

Those skilled in the art will see many modifications which can be made without departing from the scope of our invention.

We claim:

1. A fluid composition of matter comprising 50–200 parts by weight of a liquid copolymer of 1,3-butadiene and divinylbenzene in admixture with 100 parts by weight of a rubbery copolymer of 1,3-butadiene and 2-methyl-5-vinylpyridine.

2. Composition according to claim 1 wherein the liquid copolymer is present in the range 50–100 weight parts and said rubbery copolymer is a copolymer of 1,3-butadiene and 2-methyl-5-vinylpyridine prepared by polymerizing a monomeric mixture comprising 90 weight parts 1,3-butadiene and 10 weight parts 2-methyl-5-vinylpyridine.

3. A liquid potting composition of matter comprising 50–200 weight parts of a liquid copolymer of 1,3-butadiene and divinylbenzene in admixture with 100 parts by weight of a rubbery copolymer of 1,3-butadiene and 2-methyl-5-vinylpyridine having a Mooney value (ML–4 @ 212° F.) in the range 10 to 60, said liquid copolymer being produced by polymerizing a mixture of said monomers containing from 1–10 parts by weight per 100 parts total monomers of divinylbenzene in the presence of a polymerization modifier.

4. Composition according to claim 3 wherein said rubbery copolymer was produced by polymerizing a monomeric mixture comprising 90 weight parts 1,3-butadiene and 10 weight parts 2-methyl-5-vinylpyridine, said liquid copolymer was produced by polymerizing a monomeric mixture comprising 95 weight parts 1,3-butadiene and 5 weight parts divinylbenzene, and said liquid copolymer is present in the range 50–100 parts.

5. A process for producing a liquid potting composition which comprises copolymerizing at a temperature in the range −40 to 160° F. in an aqueous medium a monomeric mixture of 1,3-butadiene and divinylbenzene containing 1–10 parts by weight of said divinylbenzene in the presence of 5–50 parts by weight of a polymerization modifier for each 100 parts of monomeric material to produce a liquid copolymer of the monomers, mixing 50 to 200 weight parts of said liquid copolymer with 100 weight parts of a rubbery copolymer of 1,3-butadiene and 2-methyl-5-vinylpyridine having a Mooney value (ML–4 @ 212° F.) of 10 to 60 to produce said potting composition, and recovering said potting composition as a product of the process.

6. Process according to claim 5 wherein said rubbery copolymer is produced by polymerizing a monomeric mixture comprising 90 weight parts 1,3-butadiene and 10 weight parts 2-methyl-5-vinylpyridine and said copolymer has a Mooney value (ML–4 @ 212° F.) of 20.

References Cited in the file of this patent

UNITED STATES PATENTS

| Number | Name | Date |
|---|---|---|
| 2,414,525 | Hill | Jan. 21, 1947 |
| 2,543,844 | Fryling | Mar. 6, 1951 |
| 2,543,867 | Pritchard | Mar. 6, 1951 |
| 2,567,016 | Gessler et al. | Sept. 4, 1951 |
| 2,577,005 | Digiacomo | Dec. 4, 1951 |
| 2,631,175 | Crouch | Mar. 10, 1953 |
| 2,638,460 | Crouch | May 12, 1953 |
| 2,688,009 | Crouch et al. | Aug. 31, 1954 |
| 2,697,855 | Brown | Dec. 28, 1954 |
| 2,713,007 | Glover et al. | July 12, 1955 |
| 2,724,869 | Merrill et al. | Nov. 29, 1955 |
| 2,773,795 | Reynolds | Dec. 11, 1956 |
| 2,779,747 | Pritchard | Jan. 29, 1957 |
| 2,780,614 | Harvey | Feb. 5, 1957 |
| 2,783,165 | Borushko | Feb. 26, 1957 |
| 2,783,176 | Boicey | Feb. 26, 1957 |
| 2,888,442 | Uraneck et al. | May 26, 1959 |

OTHER REFERENCES

Javitz: Electrical Mfg., September 1951, pages 103–118.